US012597729B1

(12) United States Patent
Liang

(10) Patent No.: US 12,597,729 B1

(45) Date of Patent: Apr. 7, 2026

(54) ROTARY PROTECTIVE COVER

(71) Applicant: GUANGZHOU PRODIGY DAILY-PRODUCTION CO., LTD, Guangzhou (CN)

(72) Inventor: Zhanpeng Liang, Guangzhou (CN)

(73) Assignee: GUANGZHOU PRODIGY DAILY-PRODUCTION CO., LTD, Guangzhou (CN)

( * ) Notice: Subject to any disclaimer, the term of this patent is extended or adjusted under 35 U.S.C. 154(b) by 0 days.

(21) Appl. No.: 19/321,429

(22) Filed: Sep. 8, 2025

(30) Foreign Application Priority Data

Dec. 27, 2024 (CN) ......................... 202423262376.8

(51) Int. Cl.
*H01R 13/443* (2006.01)
*H01R 13/44* (2006.01)
*H01R 13/447* (2006.01)

(52) U.S. Cl.
CPC .................................. *H01R 13/443* (2013.01)

(58) Field of Classification Search
CPC .. H01R 13/5213; H01R 13/44; H01R 13/443; H01R 13/447
See application file for complete search history.

(56) References Cited

U.S. PATENT DOCUMENTS

| | | | | |
|---|---|---|---|---|
| 12,136,781 B1 * | 11/2024 | Konopacki | C08L 27/18 | |
| 2003/0072118 A1 * | 4/2003 | Chou | H01R 31/02 | 361/93.1 |
| 2013/0065445 A1 * | 3/2013 | Nagata | H01R 13/5213 | 439/625 |
| 2014/0094044 A1 * | 4/2014 | Ward | H01R 13/447 | 439/142 |
| 2017/0077634 A1 * | 3/2017 | Markefka | H01R 13/05 | |
| 2022/0376437 A1 * | 11/2022 | Sheldon | H02G 3/081 | |
| 2024/0055793 A1 * | 2/2024 | Yu | H01R 13/447 | |

FOREIGN PATENT DOCUMENTS

| | | | |
|---|---|---|---|
| WO | WO-2020254687 A1 * | 12/2020 | H01R 13/5213 |
| WO | WO-2021042702 A1 * | 3/2021 | H01R 35/04 |

* cited by examiner

*Primary Examiner* — Abdullah A Riyami
*Assistant Examiner* — Thang H Nguyen
(74) *Attorney, Agent, or Firm* — Nicholas Makridakis

(57) ABSTRACT

The invention discloses a rotary protective cover, the insulating insertion rods are inserted into the jacks of the socket, and the lower cover fits the socket and is hardly plugged out, thereby playing a role in preventing children from accidentally touching the socket and preventing other articles from being inserted into the socket. If it needs to plug out the rotary protective cover, the upper cover is rotated first, such that the positioning block moves in the rotation space, and in this case, the upper cover and the lower cover are diagonally staggered with a certain space, such that the rotary protective cover can be grasped and plugged out by a finger. If the rotary protective cover is inserted again for protection, the upper cover and the lower cover are rotated to be aligned after insertion to play a protecting role.

8 Claims, 4 Drawing Sheets

ROTARY PROTECTIVE COVER

TECHNICAL FIELD

The present disclosure belongs to the technical field of socket protective devices, and in particular relates to a rotary protective cover.

DESCRIPTION OF RELATED ART

A socket is also known as a power socket or a switch socket. The socket refers to a base where one or more circuit wires can be inserted, through which various wires can be inserted. Thus, it is convenient to connect the socket to other circuits. This part of circuit is connected and disconnected finally through connection and disconnection between the wires and a copper part.

At present, in many families, sockets in an energized state are placed in locations accessible to children, which is extremely dangerous for some children who lack safety awareness or are playful. When children touch the jack, an electric shock is likely to occur.

BRIEF SUMMARY OF THE INVENTION

A main objective of the present disclosure is to provide a rotary protective cover, which prevents children from accidentally touching the jacks of the socket, thereby improving the safety.

A rotary protective cover, comprising an upper cover and a lower cover, wherein the upper cover is provided with a positioning block, the lower cover is provided with a cylindrical body, the cylindrical body is provided with a first through hole, the lower cover is provided with a second through hole, the second through hole is in communication with the first through hole, two spaced limiting blocks are arranged on the second through hole, a rotation space is formed between the two limiting blocks, the positioning block passes through the first through hole and is snap-fitted to a bottom of the cylindrical body, the positioning block is rotationally arranged in the rotation space, and a plurality of insulating insertion rods are arranged on a side of the lower cover distal to the cylindrical body.

A rotary protective cover, the upper cover is provided with a touch plate, the lower cover is provided with a first plate matching the touch plate, and a protrusion is arranged on a side of the first plate proximal to the touch plate.

A rotary protective cover, the lower cover is provided with a third through hole, and the first plate is arranged on an outer side of the third through hole.

A rotary protective cover, the lower cover is provided with a first mark and a second mark, both the first mark and the second mark are arranged at the periphery of the cylindrical body, the first mark is arranged on a side of the second mark, the upper cover is provided with an observation hole, and the observation hole is formed above the first mark or the second mark.

A rotary protective cover, a plurality of conveniently twisted auxiliary recesses are arranged at the periphery of the upper cover.

A rotary protective cover, the auxiliary recesses are uniformly distributed at the periphery of the upper cover.

A rotary protective cover, the cylindrical body comprises a first cylindrical block and a second cylindrical block, both sides of the first cylindrical block are respectively connected to the lower cover and the second cylindrical block, and the first cylindrical block is arranged above the second through hole.

A rotary protective cover, a diameter of the second through hole is greater than that of the first through hole.

A technical solution in the above technical solutions of the present disclosure at least has one of the following advantages or beneficial effects:

In terms of the rotary protective cover, the insulating insertion rods are inserted into the jacks of the socket, and the lower cover fits the socket and is hardly plugged out, thereby playing a role in preventing children from accidentally touching the socket and preventing other articles from being inserted into the socket. If it needs to plug out the rotary protective cover, the upper cover is rotated first, such that the positioning block moves in the rotation space, and in this case, the upper cover and the lower cover are diagonally staggered with a certain space, such that the rotary protective cover can be grasped and plugged out by a finger. If the rotary protective cover is inserted again for protection, the upper cover and the lower cover are rotated to be aligned after insertion to play a protecting role.

BRIEF DESCRIPTION OF THE SEVERAL VIEWS OF THE DRAWINGS

The present disclosure will be further described with reference to the drawings and embodiments.

DETAILED DESCRIPTION OF THE INVENTION

Various different embodiments or examples provided in the present disclosure below are used for achieving different solutions of the present disclosure.

Figure 1:
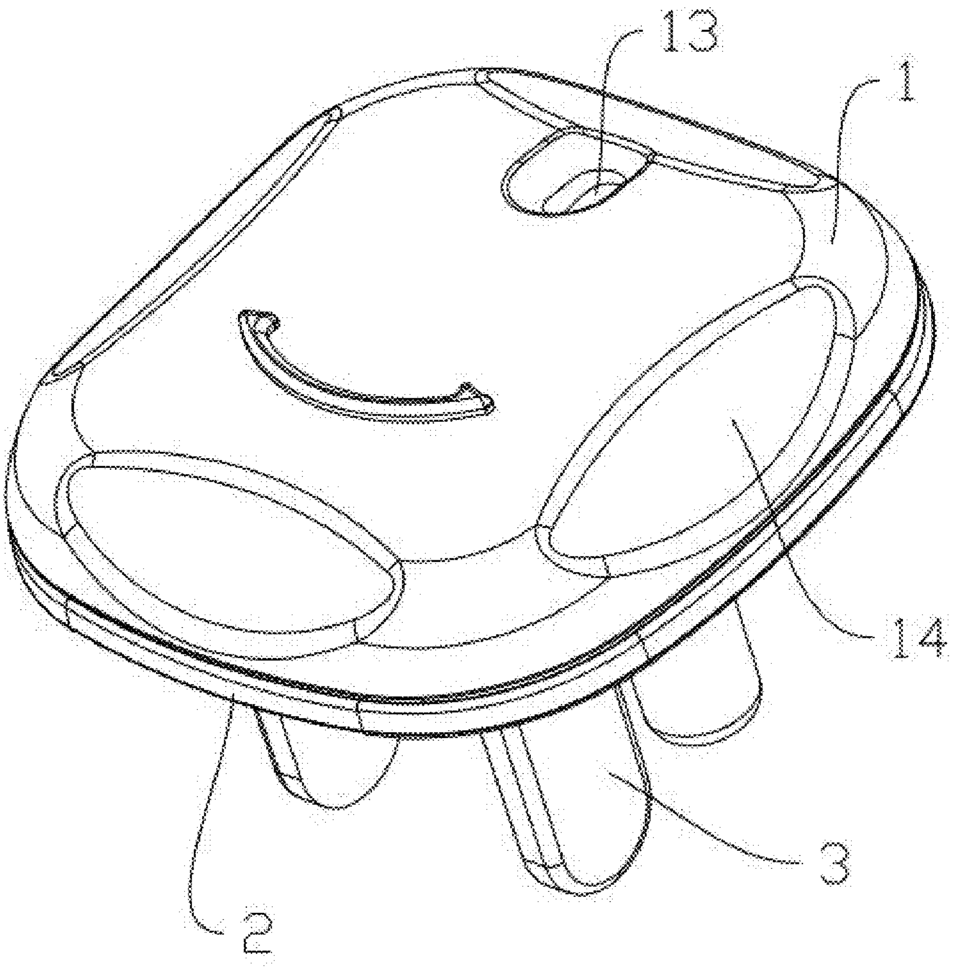
FIG. 1 is a schematic structural diagram of a rotary protective cover in an embodiment of the present disclosure.
Figure 2:
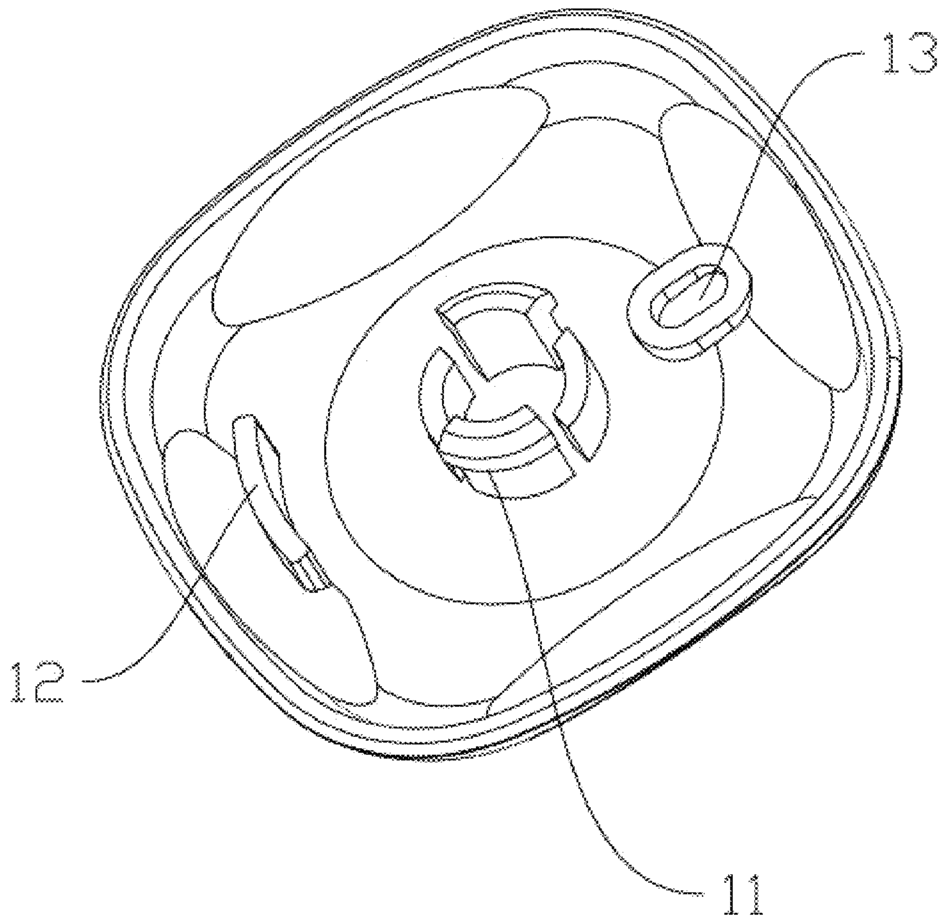
FIG. 2 is a schematic structural diagram of an upper cover in an embodiment of the present disclosure.
Figure 3:
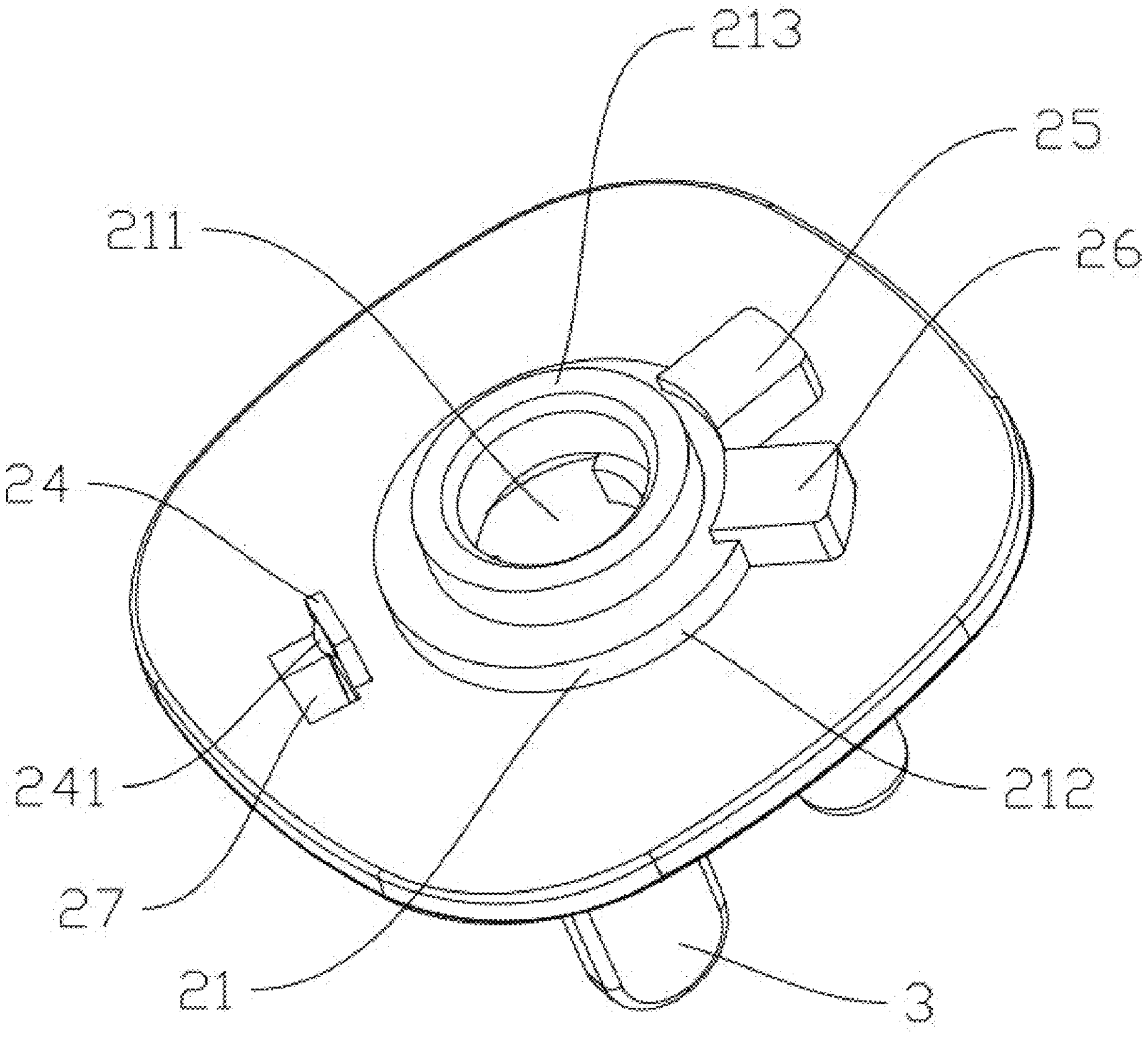
FIG. 3 is a schematic structural diagram of a lower cover in an embodiment of the present disclosure.
Figure 4:
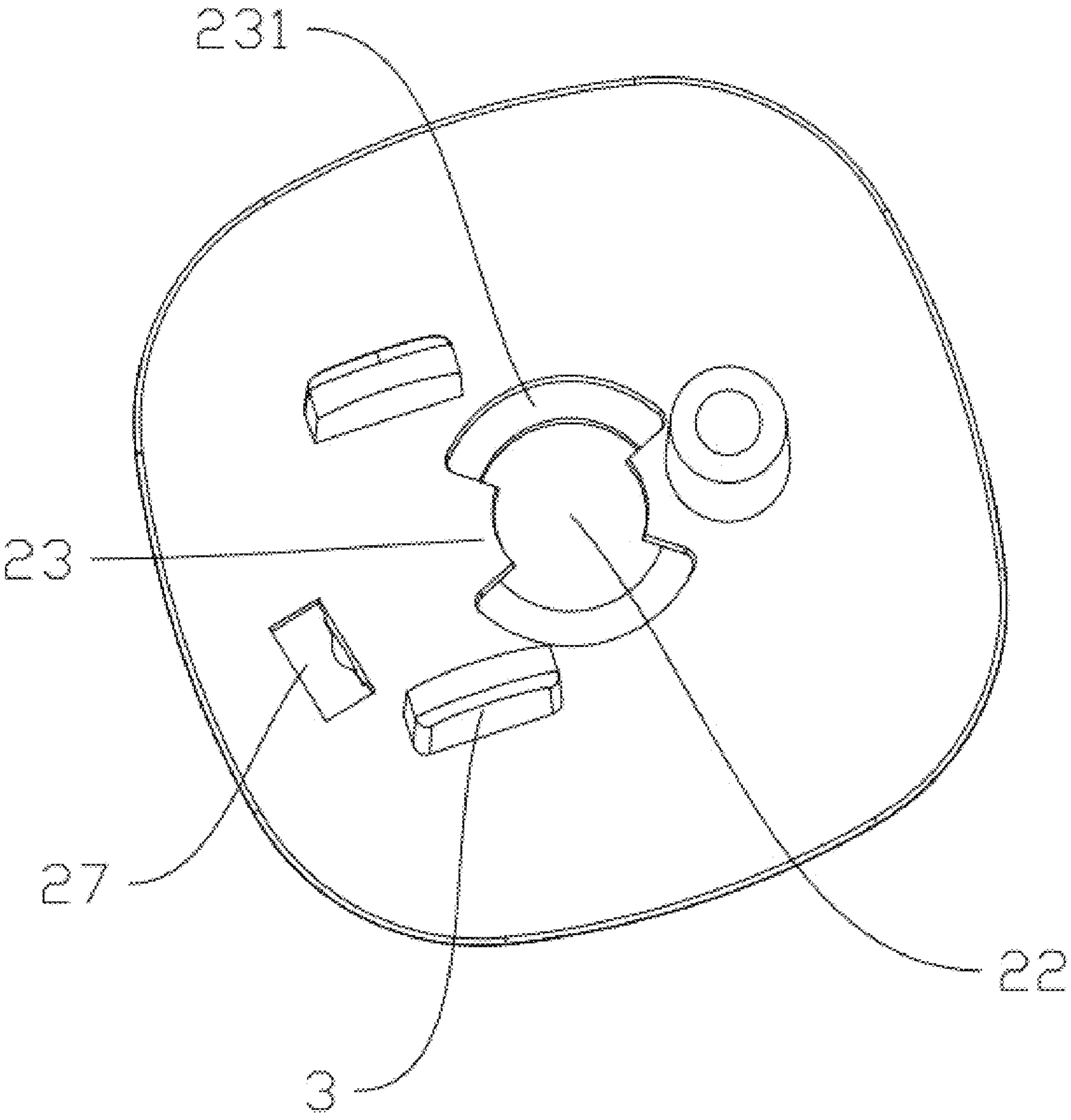
FIG. 4 is a schematic structural diagram of a lower cover in an embodiment of the present disclosure from another perspective.

Referring to FIGS. 1-4, provided is a rotary protective cover, including an upper cover 1 and a lower cover 2, where the upper cover 1 is provided with a positioning block 11, the lower cover 2 is provided with a cylindrical body 21, the cylindrical body 21 is provided with a first through hole 211, the lower cover 2 is provided with a second through hole 22, the second through hole 22 is in communication with the first through hole 211, two spaced limiting blocks 23 are arranged on the second through hole 22, a rotation space 231 is formed between the two limiting blocks 23, the positioning block 11 passes through the first through hole 211 and is snap-fitted to a bottom of the cylindrical body 21, the positioning block 11 is rotationally arranged in the rotation space 231, and a plurality of insulating insertion rods 3 are arranged on a side of the lower cover 2 distal to the cylindrical body 21.

In this embodiment, the insulating insertion rods 3 on the lower cover 2 are inserted into jacks of the socket, and the upper cover 1 is rotationally connected to the lower cover 2. When the upper cover 1 and the lower cover 2 are rotated to be aligned, the rotary protective cover is hardly grasped, which, thus, can prevent children from accidentally touching the socket and preventing other articles from being inserted into the socket, thereby improving the safety. When the upper cover 1 is rotated to a certain angle, the upper cover 1 and the lower cover 2 are diagonally staggered with a certain space, such that the rotary protective cover can be grasped by a finger and plugged out from a power socket.

In an embodiment of the present disclosure, the upper cover 1 is provided with a touch plate 12, the lower cover 2 is provided with a first plate 24 matching the touch plate 12, and a protrusion 241 is arranged on a side of the first plate 24 proximal to the touch plate 12. When the upper cover 1 is rotated, a side surface of the touch plate 12 will be in collision contact with the protrusion 241 on the first plate 24, and in this case, a vibration sense on the upper cover 1 is transferred to a hand, such that when the upper cover 1 is rotated, the hand feeling is improved.

Further, the lower cover 2 is provided with a third through hole 27, and the first plate 24 is arranged on an outer side of the third through hole 27. The contact condition between the protrusion 241 and the touch plate 12 is observed conveniently, and a sound is transmitted from the third through hole 27 when the protrusion 241 is in contact with the touch plate 12, such that the hand feeling during rotation is better improved.

In an embodiment of the present disclosure, the lower cover 2 is provided with a first mark 25 and a second mark 26, both the first mark 25 and the second mark 26 are arranged at the periphery of the cylindrical body 21, the first mark 25 is arranged on a side of the second mark 26, the upper cover 1 is provided with an observation hole 13, and the observation hole 13 is formed above the first mark 25 or the second mark 26. The first mark 25 and the second mark 26 are different in color. The first mark 25 is green, and the second mark 26 is red. When the upper cover 1 is rotated, the observation hole 13 follows the upper cover to rotate. In a case where the second mark 26 is seen when the observation hole 13 rotates, the upper cover 1 and the lower cover 2 are staggered with a certain space, such that the rotary protective cover can be plugged out by grasping the opposite angles. In a case where the first mark 25 is seen when the observation hole 13 rotates, the upper cover 1 and the lower cover 2 are in an aligned state, and in this case, the rotary protective cover is hardly plugged out.

In an embodiment of the present disclosure, a plurality of conveniently twisted auxiliary recesses 14 are arranged at the periphery of the upper cover 1. The shape of the recesses is similar to the arc shape of the finger, which facilitates twisting by the finger, thereby improving the user experience of an operator.

Preferably, the auxiliary recesses 14 are uniformly distributed at the periphery of the upper cover 1, such that a user can grasp and rotate the rotary protective cover at any angle.

In an embodiment of the present disclosure, the cylindrical body 21 includes a first cylindrical block 212 and a second cylindrical block 213, both sides of the first cylindrical block 212 are respectively connected to the lower cover 2 and the second cylindrical block 213, the first cylindrical block 212 is arranged above the second through hole 22, one end of each of the first mark 25 and the second mark 26 is connected to an outer side of the first cylindrical body 212, a bottom of the first cylindrical block 212, the second through hole 22, and the limiting blocks 23 form the rotation space 231, the positioning block 11 is only movable between the two limiting blocks 23, and the positioning block 11 passes through the second cylindrical block 213, is snap-fitted in the rotation space 231, and is slidable in the rotation space 231, such that the upper cover 1 is rotated.

In an embodiment of the present disclosure, a diameter of the second through hole 22 is greater than that of the first through hole 211, such that the rotation space 231 is formed with the limiting blocks 23 and the first cylindrical block 212.

What is claimed is:

1. A rotary protective cover, comprising an upper cover (1) and a lower cover (2), wherein the upper cover (1) is provided with a positioning block (11), the lower cover (2) is provided with a cylindrical body (21), the cylindrical body (21) is provided with a first through hole (211), the lower cover (2) is provided with a second through hole (22), the second through hole (22) is in communication with the first through hole (211), two spaced limiting blocks (23) are arranged on the second through hole (22), a rotation space (231) is formed between the two limiting blocks (23), the positioning block (11) passes through the first through hole (211) and is snap-fitted to a bottom of the cylindrical body (21), the positioning block (11) is rotationally arranged in the rotation space (231), and a plurality of insulating insertion rods (3) are arranged on a side of the lower cover (2) distal to the cylindrical body (21).

2. The rotary protective cover according to claim 1, wherein the upper cover (1) is provided with a touch plate (12), the lower cover (2) is provided with a first plate (24) matching the touch plate (12), and a protrusion (241) is arranged on a side of the first plate (24) proximal to the touch plate (12).

3. The rotary protective cover according to claim 2, wherein the lower cover (2) is provided with a third through hole (27), and the first plate (24) is arranged on an outer side of the third through hole (27).

4. The rotary protective cover according to claim 1, wherein the lower cover (2) is provided with a first mark (25) and a second mark (26), both the first mark (25) and the second mark (26) are arranged at the periphery of the cylindrical body (21), the first mark (25) is arranged on a side of the second mark (26), the upper cover (1) is provided with an observation hole (13), and the observation hole (13) is formed above the first mark (25) or the second mark (26).

5. The rotary protective cover according to claim 1, wherein a plurality of conveniently twisted auxiliary recesses (14) are arranged at the periphery of the upper cover (1).

6. The rotary protective cover according to claim 5, wherein the auxiliary recesses (14) are uniformly distributed at the periphery of the upper cover (1).

7. The rotary protective cover according to claim 1, wherein the cylindrical body (21) comprises a first cylindrical block (212) and a second cylindrical block (213), both sides of the first cylindrical block (212) are respectively connected to the lower cover (2) and the second cylindrical block (213), and the first cylindrical block (212) is arranged above the second through hole (22).

8. The rotary protective cover according to claim 1, wherein a diameter of the second through hole (22) is greater than that of the first through hole (211).

* * * * *